Patented Oct. 2, 1951

2,569,506

UNITED STATES PATENT OFFICE 2,569,506

EMULSION POLYMERIZATION OF CERTAIN VINYL COMPOUNDS USING A MERCAPTAN MODIFIER, A HYDROPEROXIDE CATALYST, AND OXYGEN

Edwin J. Vandenberg, Wilmington, Del., assignor to Hercules Powder Company, Wilmington, Del., a corporation of Delaware No Drawing. Application June 17, 1946,
Serial No. 677,405

17 Claims. (Cl. 260—82.5)

This invention relates to the polymerization of unsaturated organic compounds and, more particularly, to a method of accelerating by means of oxygen the polymerization of certain unsaturated organic compounds when these compounds are polymerized in aqueous emulsion.

It is well known that unsaturated organic compounds may be polymerized in aqueous emulsion, in solution, and in the bulk. The effect of oxygen on such polymerizations has been studied, and it is known that oxygen may exert either a beneficial or a detrimental effect upon the polymerizations, depending upon the type of monomer and the type of catalyst utilized. In the bulk photopolymerization of methyl methacrylate, for instance, it is known that the presence of oxygen inhibits the polymerization, since the rate of peroxide formation exceeds the rate of polymerization. Contrarily, it is known that air or oxygen markedly accelerates the bulk polymerization of chloroprene. Relative to emulsion polymerization systems, it has been lately discovered that in the presence of the catalysts generally known to the art, for example, sodium perborate, benzoyl peroxide, barium peroxide, hydrogen peroxide, and the like, the polymerization of certain monomers is inhibited by the presence of oxygen.

Now, in accordance with this invention, it has been found that the emulsion polymerization or copolymerization of styrenes, conjugated butadiene hydrocarbons, and halogen-substituted conjugated butadiene hydrocarbons, and the emulsion copolymerization of these compounds with other compounds containing the $CH_2=CH-$ group in the presence of a mercaptan modifier and an organic hydroperoxide catalyst may be accelerated by carrying out the polymerization or copolymerization in the presence of up to about 0.4% oxygen, based upon the monomers.

In carrying out the process in accordance with this invention, the monomeric materials previously mentioned may be polymerized in the usual manner utilizing the well-known emulsion technique, with the exceptions that the catalyst utilized constitutes an organic hydroperoxide, such as an $\alpha,\alpha$-dialkylarylmethyl hydroperoxide, and that the prescribed amount of oxygen is included in the reaction vessel. Furthermore, it is necessary that a mercaptan modifier be present. By the combination of such a modifier, the prescribed catalysts and the necessary amount of oxygen, polymerizations may be carried out at lower temperatures and in shorter reaction times, and resulting in higher yields.

The following examples are illustrative of the preparation of polymers by emulsion polymerization, and the products thereof, in accordance with this invention. All parts given in the examples represent parts by weight.

Example 1

A glass polymerization vessel was charged with 41.7 parts of a 6% solution of the sodium salt of a dehydrogenated rosin (dehydroabietic acid 53%, abietic acid 0.0%, retene 0.2%), this solution containing 2.5 parts of the sodium salt of the dehydrogenated rosin. To this solution were added 0.0841 part of $\alpha,\alpha$-dimethylbenzyl hydroperoxide, 49.88 parts of water, 1.00 part of an activating salt solution, 0.25 part of lauryl mercaptan, and 50 parts of styrene at a temperature of 25° C. The 1.00 part of activating salt solution contained 0.00525 part of 78% ferric sulfate nonahydrate, 0.075 part of sodium pyrophosphate decahydrate, and 0.00019 part of cobaltous chloride hexahydrate dissolved in 0.92 part of distilled water. The reaction vessel then was sealed, and its contents frozen by cooling, after which the vessel was opened and the free space thoroughly swept out with air, resulting in the introduction of 0.025 part of oxygen, based on the styrene. The vessel again was sealed, and the reaction mixture agitated at 40° C. for 16 hours. The emulsion was then run into an open vessel containing 5 parts of a 2% solution of phenyl-$\beta$-naphthylamine, stripped of the excess styrene, and the polymer precipitated by the addition of an excess of a saturated salt solution. The precipitated polymer was washed with water until alkali-free, then with alcohol, and finally was dried in an oven. A 93.8% yield of polystyrene was obtained.

A similar polymerization was carried out using the same proportions of ingredients except for the oxygen. The latter was supplied in the form of pure oxygen and in an amount sufficient to provide 0.2 part for every 50 parts of styrene. By this procedure, a 100% yield of polystyrene was obtained.

Example 2

Twelve and one-half parts of styrene and 37.5 parts of isoprene were copolymerized according to the process of Example 1, in which 0.025 part of oxygen was introduced, utilizing a reaction period of 48 hours. By this procedure, an 80.6% yield of polymer was obtained.

Example 3

The procedure of Example 1 was duplicated, using 0.025 part of oxygen, with the substitution of 50 parts of butadiene-1,3 for the styrene previously shown. A 96.4% yield of polymer was obtained.

A similar polymerization was effected using the same proportions of ingredients except for the oxygen. The latter was supplied in the form of pure oxygen and in an amount sufficient to provide 0.2 part for every 50 parts of butadiene-1,3. An 83% yield of polymer was obtained.

Example 4

Twelve and one-half parts of acrylonitrile and 37.5 parts of butadiene-1,3 were copolymerized following the process of Example 1, using 0.025 part of oxygen, with the exception that the polymerization was carried out for 18 hours. A 100% yield of polymer was obtained.

Example 5

Twelve and one-half parts of styrene and 37.5 parts of butadiene-1,3 were copolymerized according to the general procedure of Example 1, with the exception that in place of air a mixture of oxygen and nitrogen, sufficient to provide 0.06 part of oxygen. based on the monomers, was used to sweep out the free space in the polymerization vessel. Following a polymerization reaction period of 11 hours, an 80% yield of polymer was obtained.

Example 6

A glass polymerization vessel was charged with 41.7 parts of the emulsifying solution of Example 1. To this soap solution were added 0.15 part of potassium persulfate dissolved in 25 parts of water, 0.0171 part of $\alpha,\alpha$-dimethylbenzyl hydroperoxide, 24.88 parts of water, 1.00 part of the activating salt solution of Example 1, 12.5 parts of styrene, 0.25 part of lauryl mercaptan, and 37.5 parts of butadiene-1,3. All of the charging operations were carried out at a temperature of 25° C., after which the reaction vessel was sealed. and its contents frozen by cooling. The vessel then was opened and the free space thoroughly swept out with air, resulting in the introduction of 0.025 part of oxygen, based on the monomers, after which the vessel again was sealed and the reaction mixture agitated at 40° C. for 25 hours. The emulsion was then run into an open vessel containing 5 parts of a 2% solution of phenyl-$\beta$-naphthylamine, stripped of the excess butadiene, and the polymer precipitated by the addition of an excess of a saturated salt solution. The precipitated polymer was washed with water until alkali-free, then with alcohol, and finally was dried in an oven. An 83% yield of polymer was obtained.

The above process was duplicated with the exceptions that no activating salt solution was utilized and 0.0342 part of the hydroperoxide was used. A 76.2% yield of polymer was thus obtained.

The process also was duplicated with the exceptions that no activating salt solution and no persulfate were added, and the amount of hydroperoxide utilized was 0.0841 part. After a polymerization reaction period of 22 hours, a 59.2% yield of polymer was obtained.

Example 7

The general procedure of Example 5 was followed, using 0.057 part of t-butyl hydroperoxide in place of the $\alpha,\alpha$-dimethylbenzyl hydroperoxide, and sweeping out the reaction vessel with air so as to introduce 0.025 part of oxygen. The polymerization was carried out for 16 hours, resulting in a 79.4% yield. When the polymerization was carried out for 22 hours, a 96.4% yield was obtained.

Example 8

The general procedure of Example 5 was followed, using 2.5 parts of a fatty acid soap (sodium salt of a mixture of palmitic and stearic acids), and a mixture of oxygen and nitrogen to sweep out the free space in the reaction vessel. The oxygen-nitrogen mixture was so made up to result in the addition of 0.006 part of oxygen. A reaction period of 7 hours resulted in a 69% yield of polymer. Under identical conditions, with the exception that 0.0125 part of oxygen was introduced, a 73% yield resulted. Likewise, 0.025 part of oxygen gave a 76% yield.

Following the above procedure, using 2.5 parts of sodium laurate as the emulsifying agent and 0.025 part of oxygen, a 91% yield of polymer was obtained in 11 hours. In 16 hours, the yield was 100%.

Example 9

A polymerization similar to that in Example 1 was carried out using 0.1072 part of $\alpha,\alpha$-dimethyl-p-isopropylbenzyl hydroperoxide in place of the $\alpha,\alpha$-dimethylbenzyl hydroperoxide, and utilizing 0.2 part of oxygen, the remaining ingredients being in the same proportions as in Example 1. A 100% yield of polystyrene was obtained.

Example 10

The procedure of Example 9 was followed with the exception that 0.0911 part of $\alpha,\alpha$-dimethyl-p-methylbenzyl hydroperoxide was used in place of the $\alpha,\alpha$-dimethyl-p-isopropylbenzyl hydroperoxide. A 100% yield of polystyrene resulted.

Example 11

A glass polymerization vessel was charged with 41.7 parts of the emulsifying solution of Example 1. To this soap solution were added 0.085 part of $\alpha,\alpha$-dimethylbenzyl hydroperoxide, 41.6 parts of water, 10 parts of the activating salt solution of Example 1, 12.5 parts of methyl methacrylate, 0.25 part of lauryl mercaptan, and 37.5 parts of butadiene-1,3. All of the charging operations were carried out at a temperature of 25° C., after which the reaction vessel was sealed, and its contents frozen by cooling. The vessel then was opened and the free space thoroughly swept out with air, resulting in the introduction of 0.025 part of oxygen, based on the monomers, after which the vessel again was sealed and the reaction mixture agitated at 40° C. for 40 hours. Upon working up the reaction mixture as in Example 1 a 92% yield of copolymer was obtained.

The organic hydroperoxides which are operable in this invention have been illustrated by the examples with the use of $\alpha,\alpha$-dimethyl-p-methylbenzyl, $\alpha,\alpha$-dimethylbenzyl, $\alpha,\alpha$-dimethyl-p-isopropylbenzyl, and t-butyl hydroperoxides. Other alkyl hydroperoxides corresponding to the t-butyl hydroperoxide, such as t-amyl hydroperoxide, also are operable in accordance with this invention. The $\alpha,\alpha$-dialkylarylmethyl hydroperoxides used in the process of this invention may be prepared by the oxidation of alkyl-substituted aromatic compounds having the structural formula

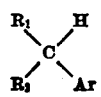

in which $R_1$ and $R_2$ represent alkyl groups and Ar represents a substituent selected from the group consisting of aryl and substituted aryl groups. The oxidation may be carried out in the liquid phase utilizing air or molecular oxygen as the oxidizing agents. A preferred method of preparing these hydroperoxides involves the liquid phase oxidation of the alkyl-substituted aromatic organic compounds having the above structural formula by passing an oxygen-containing gas through the compounds at a temperature between about 25° C. and about 95° C. in the presence of an aqueous alkali. The concentration of the aqueous alkali may be between about 1% and about 35%, although it is preferable to use concentrations of about 2% to about 8%. Vigorous agitation is desirable during the oxidation reaction.

As illustrative of the alkyl-substituted aromatic organic compounds which may be oxidized, p-cymene, cumene, and diisopropyl benzene may be mentioned. These compounds lead to $\alpha,\alpha$-dimethyl-p-methylbenzyl, $\alpha,\alpha$-dimethylbenzyl, and $\alpha,\alpha$-dimethyl-p-isopropylbenzyl hydroperoxides, respectively. The aryl and substituted aryl groups need not be derived from benzene, as is the case in the afore-mentioned compounds, for compounds containing aromatic nuclei derived from naphthalene, anthracene, phenanthrene, and the like, also are operable when dissolved in a suitable solvent during the oxidation. The aryl group may be substituted with alkyl groups such as methyl, ethyl, propyl, isopropyl, butyl, isobutyl, tertiary butyl, and the like to give alkaryl substituents, the same alkyl groups also being representative of $R_1$ and $R_2$ in the structural formula. $R_1$ and $R_2$ may be either the same or different.

The amount of hydroperoxide which may be used in accordance with this invention may be between about 0.5% and about 9%, based on the amount of solid emulsifying agent used. The preferable amount of hydroperoxide on this basis, however, is from about 2% to about 9%, and a particularly applicable amount is from about 2% to about 5%. When, as in Example 6, a water-soluble persulfate is used in conjunction with the hydroperoxide to catalyze the polymerization, the amount of hydroperoxide may be considerably less than when no persulfate is present. Under such circumstances, the amount of hydroperoxide may range from about 0.5% to about 2%, a particularly applicable amount being about 1%.

The process of this invention may be carried out using various emulsifying agents, such as fatty acid soaps; the water-soluble salts of hydrogenated and dehydrogenated rosins or the pure acids thereof, such as dihydroabietic, tetrahydroabietic and dehydroabietic acids; the water-soluble salts of the amines derived from hydrogenated and dehydrogenated rosins or the pure acids thereof, for example, the acetates of dihydroabietylamine, tetrahydroabietylamine, and dehydroabietylamine; and any other emulsifying agent well known in the art. The rosin amines mentioned may be prepared by converting the acids in the rosin material to the corresponding nitriles by treatment with ammonia under dehydrating conditions, and then reducing the nitriles to the amines by catalytic hydrogenation.

Most of the examples, however, have shown the use of a salt of a dehydrogenated rosin as emulsifying agent. Such salts are prepared by neutralization of a dehydrogenated rosin with an alkali metal compound basic in characteristics, such as the hydroxide or carbonate of sodium or potassium. The dehydrogenated rosins are prepared by the dehydrogenation or disproportionation of natural rosin or a rosin material containing a substantial amount of a natural rosin. The dehydrogenation or disproportionation reaction is carried out by contacting the rosin or rosin material at an elevated temperature with an active hydrogenation catalyst in the absence of added hydrogen. Catalyst such as palladium, platinum, nickel, and copper chromite are suitable and may be supported on a carrier such as granular alumina, fibrous asbestos or activated charcoal. The catalytic treatment may be conducted either by a batchwise or continuous procedure. The rosin may be agitated, for example, with about 5% to about 20% by weight of a palladium catalyst supported on activated carbon (1% to 2% palladium) at about 150° C. to about 300° C. for about 1 hour to about 5 hours. In the continuous process the molten rosin flows over a supported palladium catalyst at a temperature within the range of about 225° C. to about 300° C. to provide a contact time of about ¼ hour to about 1 hour.

It often is advantageous to refine the whole rosin prior to its dehydrogenation or disproportionation and the same is true as applied to the whole dehydrogenated or disproportionated product. Prior to its dehydrogenation or disproportionation the rosin may be refined by crystallization, by means of a selective solvent such as furfural or phenol, or by an absorbent earth such as fuller's earth. The dehydrogenated or disproportionated rosin product may be refined by distillation, heat-treatment, alkali extraction, precipitation, etc. It is desirable that the dehydrogenated or disproportionated rosin or derivative thereof contain at least 45% and preferably at least 50% dehydroabietic acid. The dehydrogenated or disproportionated rosin also should contain less than 1% abietic acid.

The examples have shown the use of air and oxygen and of mixtures of oxygen and nitrogen as the source of the oxygen used in accordance with this invention, but mixtures of oxygen with other inert gases and of air with an inert gas such as nitrogen are operable. It is desirable that oxygen be the only oxygen-yielding gas present. The amount of oxygen may be varied up to about 0.4%, based on the monomers. The beneficial effect of oxygen is most noticeable in the range from about 0.01% to about 0.4 %, and a preferable range is from about 0.05% to about 0.2%.

As shown by the examples, various activating salts may be added to the polymerization reaction mixture. The activating salts shown by the examples; namely, ferric sulfate, sodium pyrophosphate, and cobaltous chloride, constitute a redox system, which is so called because of its property of catalyzing oxidation-reduction reactions. Such systems usually comprise a salt of a heavy metal, such as iron, cobalt, or nickel associated with a complex-forming compound, such as a pyrophosphate. The redox system, therefore, comprises essentially a heavy metal complex wherein the metal is united to another element through coordinate convalences rather than primary valences. Amounts between about 0.1% and about 2% by weight of the heavy metal complexes, based on the monomers present, may be used, and amounts between about 0.1% and about 1% by weight are generally suitable. The salts of some heavy metals, such as iron, are sufficiently active so that the salt of only one metal need be present, but usually the redox system contains at least two heavy metal salts, and each individual salt may be present in the redox system in amounts between about 0.0003% and about 0.1% by weight, based on the monomers employed, though amounts between about 0.0003% and about 0.01% by weight are generally sufficient.

Compounds which may be advantageously polymerized in aqueous emulsion in accordance with this invention include the styrenes, such as styrene, $\alpha$-methyl styrene, p-methyl styrene, $\alpha$-p-dimethyl styrene, p-chlorostyrene, etc.; the conjugated butadiene hydrocarbons, such as butadiene, and its derivatives, such as isoprene, dimethyl butadiene, etc.; and the halogen-substituted conjugated butadiene hydrocarbons, such as chloroprene. These compounds may be either polymerized individually or copolymerized with one another. The above compounds also may be copolymerized with another compound containing the $CH_2=CH-$, or vinyl, group, such as acrylonitrile, methyl acrylate, methyl methacrylate, methyl vinyl ketone, methyl isopropenyl ketone, etc. Copolymer systems involving from two to four different monomers may be utilized, but an even greater number of monomers would be operable.

The polymerizations may be carried out under conditions well known in the art for emulsion polymerization; e. g., concentration of reactants, temperature, pressure, etc. The temperature of the polymerization reaction may vary from about 20° C. to about 100° C., and the concentration of the emulsifying agent in the aqueous phase may be varied from about 1% to about 5%, preferably from about 2% to about 3%. During the polymerizations, it is necessary that a mercaptan modifier be present. All of the mercaptan modifiers well known to the art, such as lauryl mercaptan, are operable.

When used in conjunction with a mercaptan modifier and the prescribed amount of oxygen, the organic hydroperoxide catalysts of this invention permit a higher yield of polymer under the same conditions than do the catalysts as previously used in the art. By this invention, the time required to obtain a given yield of polymer is reduced as compared to previous processes, thereby increasing the capacity of a polymerization vessel and decreasing the cost of the polymer. Furthermore, through practice of this invention, increased yields are obtained by polymerizations carried out at lower temperatures for periods of time comparable to those which have been previously used.

The process of this invention as used in the preparation of rubberlike polymers does not materially change the properties of such polymers as they have been recognized before. The process also is very applicable to polymerizations carried out with soaps of dehydrogenated rosin as emulsifying agents. It is known that dehydrogenated rosin soaps impart desirable physical properties to rubberlike polymers, such as those derived from the copolymerization of butadiene and styrene, but the use of these soaps has been somewhat disadvantageous due to the fact that they necessitated longer reaction periods than did fatty acid soaps. The process of this invention permits the use of dehydrogenated rosin soaps to obtain in comparable lengths of time polymer yields which are equivalent to those obtained under previously utilized conditions with fatty acid soaps as emulsifying agents.

What I claim and desire to protect by Letters Patent is:

1. The process which comprises polymerizing in aqueous emulsion at least one monomeric organic compound of the group consisting of a styrene, a conjugated butadiene hydrocarbon and a halogen-substituted conjugated butadiene hydrocarbon, in the presence of an alkyl mercaptan modifier, an organic hydroperoxide catalyst, and an amount of oxygen from 0.01% to 0.4%, based on the monomer.

2. The process which comprises copolymerizing in aqueous emulsion at least one monomeric organic compound of the group consisting of a styrene, a conjugated butadiene hydrocarbon and a halogen-substituted conjugated butadiene hydrocarbon with another organic compound containing the $CH_2=CH-$group, in the presence of an alkyl mercaptan modifier, an organic hydroperoxide catalyst, and an amount of oxygen from 0.01% to 0.4%, based on the monomer.

3. The process which comprises polymerizing in aqueous emulsion at least one monomeric organic compound of the group consisting of a styrene, a conjugated butadiene hydrocarbon and a halogen-substituted conjugated butadiene hydrocarbon, in the presence of an alkyl mercaptan modifier, an organic hydroperoxide catalyst, an activator comprising a water-soluble pyrophosphate and water-solube salts of two heavy metals selected from the group consisting of iron, cobalt and nickel, and an amount of oxygen from 0.01% to 0.4%, based on the monomer.

4. The process which comprises polymerizing in aqueous emulsion at least one monomeric organic compound of the group consisting of a styrene, a conjugated butadiene hydrocarbon and a halogen-substituted conjugated butadiene hydrocarbon, in the presence of an alkyl mercaptan modifier, an organic hydroperoxide catalyst, an activator comprising a water-soluble pyrophosphate and water-soluble salts of iron and cobalt, and an amount of oxygen from 0.01% to 0.4%, based on the monomer.

5. The process which comprises polymerizing in aqueous emulsion at least one monomeric organic compound of the group consisting of a styrene, a conjugated butadiene hydrocarbon and a halogen-substituted conjugated butadiene hydrocarbon, in the presence of an alkyl mercaptan modifier, an organic hydroperoxide catalyst, an activator comprising sodium pyrophosphate, ferric sulfate and colbaltous chloride, and an amount of oxygen from 0.01% to 0.4%, based on the monomer.

6. The process which comprises polymerizing in aqueous emulsion at least one monomeric organic compound of the group consisting of a styrene, a conjugated butadiene hydrocarbon and a halogen-substituted conjugated butadiene hydrocarbon, in the presence of an alkyl mercaptan modifier, an organic hydroperoxide catalyst, and an amount of oxygen from 0.05% to 0.2%, based on the monomer.

7. The process which comprises polymerizing in aqueous emulsion butadiene-1,3 in the presence of an alkyl mercaptan modifier, an organic hydroperoxide catalyst, and an amount of oxygen from 0.01% to 0.4%, based on the monomer.

8. The process which comprises copolymerizing in aqueous emulsion butadiene-1,3 and styrene in the presence of an alkyl mercaptan modifier, an organic hydroperoxide catalyst, and an amount of oxygen from 0.01% to 0.4%, based on the monomers.

9. The process which comprises copolymerizing in aqueous emulsion butadiene-1,3 and acrylonitrile in the presence of an alkyl mercaptan modifier, an organic hydroperoxide catalyst, and an amount of oxygen from 0.01% to 0.4%, based on the monomers.

10. The process which comprises polymerizing in aqueous emulsion butadiene-1,3 in the presence of lauryl mercaptan as a modifier, an alkyl hydroperoxide catalyst, and an amount of oxygen from 0.01% to 0.4%, based on the monomer.

11. The process which comprises copolymerizing in aqueous emulsion butadiene-1,3 and styrene in the presence of lauryl mercaptan as a modifier, t-butyl hydroperoxide as a catalyst, and an amount of oxygen from 0.01% to 0.4%, based on the monomers.

12. The process which comprises copolymerizing in aqueous emulsion butadiene-1,3 and acrylonitrile in the presence of lauryl mercaptan as a modifier, t-amyl hydroperoxide as a catalyst, and an amount of oxygen from 0.01% to 0.4%, based on the monomers.

13. The process which comprises copolymerizing in aqueous emulsion butadiene-1,3 and styrene in the presence of lauryl mercaptan as a modifier, t-butyl hydroperoxide as a catalyst, an activator comprising sodium pyrophosphate, ferric sulfate and cobaltous chloride, and 0.1% of oxygen, based on the monomers.

14. The process which comprises copolymerizing in aqueous emulsion butadiene-1,3 and styrene in the presence of an alkyl mercaptan modifier, an α,α-dialkylarylmethyl hydroperoxide as a catalyst, and an amount of oxygen from 0.01% to 0.4%, based on the monomers.

15. The process which comprises copolymerizing in aqueous emulsion butadiene-1,3 and acrylonitrile in the presence of an alkyl mercaptan modifier, an α,α-dialkylarylmethyl hydroperoxide as a catalyst, and an amount of oxygen from 0.01% to 0.4%, based on the monomers.

16. The process which comprises copolymerizing in aqueous emulsion butadiene-1,3 and styrene in the presence of lauryl mercaptan as a modifier, an α,α-dimethylbenzyl hydroperoxide as a catalyst, and an amount of oxygen from 0.01% to 0.4%, based on the monomers.

17. The process which comprises copolymerizing in aqueous emulsion butadiene-1,3 and acrylonitrile in the presence of lauryl mercaptan as a modifier, an α,α-dimethylbenzyl hydroperoxide as a catalyst, and an amount of oxygen from 0.01% to 0.4%, based on the monomers.

EDWIN J. VANDENBERG.

REFERENCES CITED

The following references are of record in the file of this patent:

UNITED STATES PATENTS

| Number | Name | Date |
|---|---|---|
| 2,281,613 | Wollthan | May 5, 1942 |
| 2,366,328 | Fryling | Jan. 2, 1945 |
| 2,367,805 | Semple | Jan. 23, 1945 |
| 2,380,473 | Stewart | July 31, 1945 |
| 2,393,007 | Wolfe | Jan. 15, 1946 |
| 2,409,996 | Roedel | Oct. 22, 1946 |
| 2,416,440 | Fryling | Feb. 25, 1947 |
| 2,427,847 | Fryling | Sept. 23, 1947 |
| 2,430,590 | Stewart | Nov. 11, 1947 |